United States Patent [19]

Esplin

[11] Patent Number: 4,586,848
[45] Date of Patent: May 6, 1986

[54] METHOD OF STORING LOGS

[75] Inventor: Gordon J. Esplin, North Vancouver, Canada

[73] Assignee: British Columbia Research Council, Vancouver, Canada

[21] Appl. No.: 675,353

[22] Filed: Nov. 27, 1984

[51] Int. Cl.⁴ .............................................. E02B 3/00
[52] U.S. Cl. ...................................... 405/60.5; 405/52
[58] Field of Search ............... 405/60.5, 62, 63, 52, 405/53

[56] References Cited

U.S. PATENT DOCUMENTS

| | | | |
|---|---|---|---|
| 4,174,186 | 11/1979 | Kasai et al. | 405/71 |
| 4,405,259 | 9/1983 | Koskivirta et al. | 405/62 |
| 4,425,053 | 1/1984 | Muto et al. | 405/63 |
| 4,429,683 | 2/1984 | Hull | 126/415 |
| 4,440,148 | 4/1984 | Assaf | 126/415 |

FOREIGN PATENT DOCUMENTS

| | | |
|---|---|---|
| 622613 | 6/1961 | Canada . |
| 862401 | 2/1971 | Canada . |
| 912294 | 10/1972 | Canada . |
| 958230 | 11/1974 | Canada . |
| 966677 | 4/1975 | Canada . |

Primary Examiner—Cornelius J. Husar
Assistant Examiner—Kristina I. Hall
Attorney, Agent, or Firm—Christie, Parker & Hale

[57] ABSTRACT

A method for storing logs. A containment curtain is deployed around a plurality of logs. Fresh water is admitted into the region defined by the curtain to form a two layered bay. The upper layer of water is fresh water and contains the logs to be stored. The lower layer of water is salt water.

3 Claims, 2 Drawing Figures

METHOD OF STORING LOGS

FIELD OF THE INVENTION

This invention relates to a method for storing logs in sea water. More specifically the invention relates to a method for storing log rafts or log bundles in coastal bays and fjords so as to prevent damage to the logs by marine life and to minimize the uptake of sea salt by the logs.

DESCRIPTION OF THE PRIOR ART

A common and economical method of transporting and storing logs in log producing coastal regions is to use the nearby waterways. Timber organized for log rafts or bundles floats and it is therefore simple to tow the rafts or bundles by tug boats to various mills or processing areas. Logs are often secured in a "booming ground" while they await transportation in this manner and once towed to a processing plant may again be stored in such a booming ground. Where possible these storage areas are chosen to be in an estuary where fresh water flows from a river, stream or the like over the denser salt water. The fresh water - sea water interface is referred to as a halocline. Very little mixing of the water occurs here under calm sea conditions because the stratification is inherently stable. Thus a fresh water environment exists over a salt water system.

This phenomenon has been observed by the inventor while diving in the sea near a source of fresh water. Solar ponds also utilize this phenomenon in which, due to a lack of vertical mixing, the lower salt water layer becomes heated by solar radiation.

These estuaries offer many advantages to the forest industry. Marine worms cannot survive in the low salinity of the upper fresh water layer in which the logs are stored. The worms would otherwise bore into the logs thus damaging them and making them unsuitable as lumber. Sea salt uptake by the logs is naturally decreased and this results in fewer logs lost through sinking, which can occur when logs stored in salt water increase density to such an extent by salt absorption that they sink when subsequently entering fresh water. Further, a decreased salt water uptake by the logs diminishes the problems of corrosion and of reduced processing efficiency in coastal pulp mills.

Despite the above advantages estuary log storage presents problems to the forest industry. Very few suitable estuaries exist near regions where, for logistical reasons, it would be desirable to store the logs. Secondly log storage assemblies located in such estuaries cause environmental damage. The logs themselves obstruct the entry of the sun's rays to the estuary ecosystem and the bark from the logs damages the benthic community. For these reasons the forest industry tends to keep log storage assemblies out of estuaries and retains them in salt water offshore. However the salt water log storage has the disadvantages outlined above, that is marine worm infestation, subsequent sinking of logs and reduced pulp mill efficiency.

SUMMARY OF THE INVENTION

The present invention seeks to alleviate the disadvantages of water log storage in the forest industry by providing a means for creating an artificial estuary having the desirable stratification characteristics of a naturally formed estuary but which may be produced in any desired area and thus away from areas where log storage might cause excessive environmental damage.

More specifically the present invention is a method for storing logs comprising deploying a containment curtain around a plurality of logs; admitting fresh water into the region defined by the curtain to form a two layered bay, the upper layer of water comprising fresh water and containing the logs to be stored, the lower layer of water comprising salt water.

DRAWINGS

Aspects of the invention are illustrated, merely by way of example, in the accompanying drawings in which:

FIG. 1 is a view illustrating a method of storing logs according to the present invention; and FIG. 2 is a plan view of FIG. 1.

DESCRIPTION OF THE PREFERRED EMBODIMENTS

Figure 1:
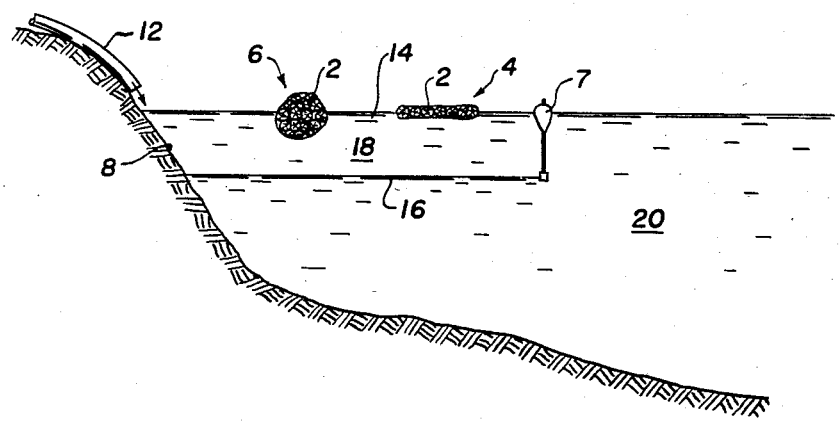
Figure 2:
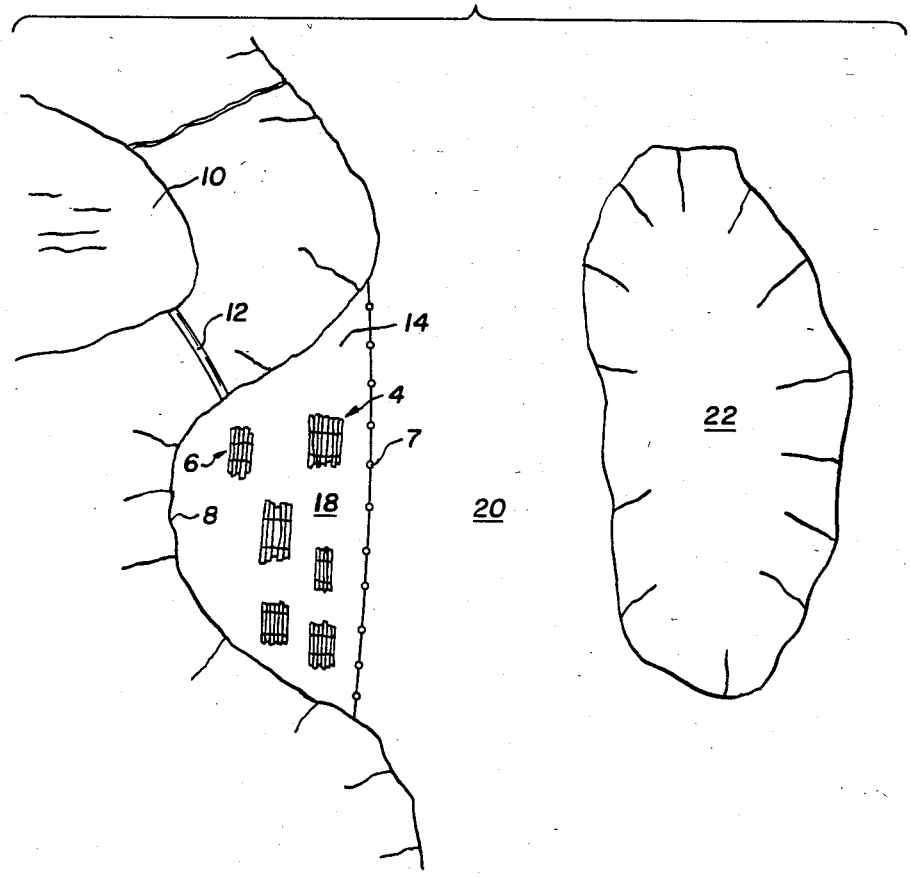

The method illustrated in FIG. 1 comprises storing logs 2, preferably in preformed rafts 4 or bundles 6, within a containment curtain 7, close to a coastal shoreline 8. The containment curtain employs to a large extent technology already developed for use in oil containment booms. The design and deployment of such a curtain would therefore be performed in a conventional manner.

A continuous supply of fresh water diverted from say a river or lake 10, for example by a flume or pipeline 12, would then be released inside the containment curtain 7 so as to create an artificial estuary or fresh water bay 14 complete with halocline 16. Fresh water 18 would exist over the salt water 20. The curtain 7 is best set up behind an island 22 if at all possible to minimize the mixing effect of incoming waves.

It will be appreciated that such an estuary or bay 14 has all the advantages with respect to log storage possessed by a natural estuary but will have none of the detrimental environmental affects since the site where it is formed can be chosen to avoid this disadvantage.

I claim:

1. A method for storing logs comprising:
   deploying a containment curtain around a plurality of logs;
   admitting fresh water into the region defined by the curtain to form a two layered bay, the upper layer of water comprising fresh water and containing the logs to be stored, the lower layer of water comprising salt water.

2. A method as claimed in claim 1 in which the fresh water is added continuously to the region surrounded by the curtain to make up for losses due to mixing with the salt water.

3. A method as claimed in claim 1 in which the fresh water is added intermittently to the region surrounded by the containment curtain to make up for losses due to mixing with salt water.

* * * * *